United States Patent
Liu et al.

(10) Patent No.: US 9,817,880 B1
(45) Date of Patent: Nov. 14, 2017

(54) SOCIAL-AWARE RESOURCE ALLOCATION FOR LARGE-SCALE DISTRIBUTED SYSTEMS

(71) Applicant: GOOGLE INC., Mountain View, CA (US)

(72) Inventors: Yifang Liu, Mountain View, CA (US); Clemens Buehling, Mountain View, CA (US); Fei Ye, Mountain View, CA (US)

(73) Assignee: Google Inc., Mountain View, CA (US)

( * ) Notice: Subject to any disclaimer, the term of this patent is extended or adjusted under 35 U.S.C. 154(b) by 957 days.

(21) Appl. No.: 14/095,723

(22) Filed: Dec. 3, 2013

(51) Int. Cl.
*G06F 7/00* (2006.01)
*G06F 17/30* (2006.01)
*G06F 17/00* (2006.01)

(52) U.S. Cl.
CPC .... *G06F 17/30581* (2013.01); *G06F 17/3007* (2013.01); *G06F 17/30073* (2013.01); *G06F 17/30091* (2013.01)

(58) Field of Classification Search
CPC .......... G06F 17/3007; G06F 17/30073; G06F 17/30091; G06F 17/30581
See application file for complete search history.

(56) References Cited

U.S. PATENT DOCUMENTS

| 5,721,904 A * | 2/1998 | Ito ..................... G06F 17/30067 704/9 |
| 9,020,965 B1 * | 4/2015 | Sehrer ................. G06F 17/3053 707/758 |
| 2006/0224898 A1 * | 10/2006 | Ahmed .................... G06F 21/36 713/186 |
| 2014/0143407 A1 * | 5/2014 | Zhang ................... H04L 41/145 709/224 |
| 2014/0330782 A1 * | 11/2014 | Abuelsaad .......... H04L 67/1095 707/634 |

* cited by examiner

*Primary Examiner* — Kannan Shanmugasundaram
(74) *Attorney, Agent, or Firm* — Shumaker & Sieffert, P.A.

(57) ABSTRACT

A system and method for social-aware clustering of user data replicas in a large-scale distributed computing system is disclosed. An exemplary system finds at least one user's connected users based on communications between the user and other users. The datacenters that contain the user replicas of the user's connected users are found. Connections and connection weights between the user and the user's connected users' datacenters are computed. The preferred datacenters for the user's current user data replica is computed based on the location of the connected datacenters and the weights of the connections. An optimization model minimizes the distance between the user's current datacenter and the user's preferred datacenter to reduce network traffic and central processing unit usage and determines the user's datacenter. The user's current datacenter is updated to the datacenter determined by running the optimization model.

12 Claims, 8 Drawing Sheets

SOCIAL-AWARE RESOURCE ALLOCATION FOR LARGE-SCALE DISTRIBUTED SYSTEMS

BACKGROUND

As shown in FIG. 1, large-scale distributed systems provide networked online storage and allow multiple computing devices to store, access, and share files in the online storage. Distributed systems may use a client/server architecture in which one or more central servers store data and provide data access to network clients. Data may be stored in multiple datacenters such as the example datacenter illustrated in FIG. 7.

A large-scale distributed system may be an email system, a messaging system, a videoconferencing system, or another communication system. Within a large-scale distributed system, an individual user of such a large-scale distributed system may communicate with multiple other users in the system, communicating with some users more frequently than others. The individual user may also use different means of communication to interact with others. For example, a User A may text User B constantly and email Users C and D daily.

These large-scale distributed systems may rely heavily on user data for functionality and performance. Such systems may need to store user data, including messages, posts, pictures, videos, audio, and email among other data. The systems may also create multiple copies of user data, referred to as user data replicas, to help quickly and efficiently provide access to user data.

Determining exactly how to allocate resources within a large-scale distributed system can be a difficult global loadbalancing problem. Several factors need to be considered in order to find a solution to this problem. System resources such as processors, servers, storage devices, and user replicas should be allocated so that user data can be quickly and efficiently processed, accessed, and stored. Resources may be allocated across data centers and should be allocated in a way that ensures that the large-scale distributed system is stable and reliable. Performance of backend data storage and compliance with distributed transaction constraints should also be considered when deciding how to allocate system resources.

Conventional models provide solutions to the global loadbalancing problem and reduce the computational complexity of determining user data replica placement in large-scale distributed systems. Some conventional models consider distributed transaction needs, system stability and reliability requirements, and performance optimization. However, as recognized by the inventors, a distributed system may also need to take into consideration the communication patterns among users in a social manner in order to improve system performance and reduce resource usage.

SUMMARY

This specification describes technologies relating to resource allocation in general, and specifically to methods and systems for social-aware clustering of user data replicas in a distributed computing system.

In general, one aspect of the subject matter described in this specification can be embodied in a system and method for social-aware clustering of user data replicas in a large-scale distributed computing system. An exemplary system includes: one or more processing devices and one or more storage devices storing instructions that, when executed by the one or more processing devices, cause the one or more processing devices to execute an exemplary method. An exemplary method includes: creating a social graph which shows a user's connected users; determining the user's user data replica's preferred datacenters for the user's current user data replica using the social graph; minimizing a distance between the user's current user data replica's current datacenter and the user's current user data replica's preferred datacenters; and updating the datacenter for the user's current user data replica to the datacenter determined by the minimization.

These and other embodiments can optionally include one or more of the following features. The steps of determining, minimizing, and updating listed above may be repeated to incrementally minimize the distance between the user's current user data replica's current datacenter and the user's user data replica's preferred datacenters. Creating a social graph may include creating user connections for the user, where each connection is based on communications between the user and one other use in the large-scale distributed system and computing connection weights for each user connection, each weight representing a measurement of the frequency and types of communication between the user and the one other user. Uses may be grouped by users' preferred datacenters to minimize the distance between each user's current user data replica's datacenter and the user's current user data replica's preferred datacenter. Computing preferred datacenters for a user's current user data replica may be based on the user's connected datacenters which contain the user's connected user's current data replicas and the weights of the connections between the user and the connected datacenters. Computing datacenters for a user may be based on the datacenters which contain the user's data replicas. Daily traffic intensity may be used to determine preferred datacenters. Daily traffic levels may be used to determine preferred datacenters. Computing connections and connection weights between a user and the user's connected datacenters may include a social connection decay function. Computing connections and connection weights between a user and the user's connected datacenters may include a communication traffic combination function to compute the weight on a connection between the user and at least one other user, the two users communicating in multiple different ways. Computing connections and connection weights between a user and the user's connected datacenters may also include using a function that takes into account both time-decaying effect and traffic type effect.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Aspects of the inventive concepts include a large-scale distributed system which takes into account social behavior among users to reduce network traffic and communication latency by improving user data replica placement. In addition to the constraints and objectives of conventional models, an exemplary embodiment also tries to place the user data replicas of frequently communicating users in the same datacenter or closely located (co-regional) datacenters. The exemplary model includes a social-aware clustering model and a social-aware algorithm that uses a user's social graph to determine user replica placement.

Figure 1:
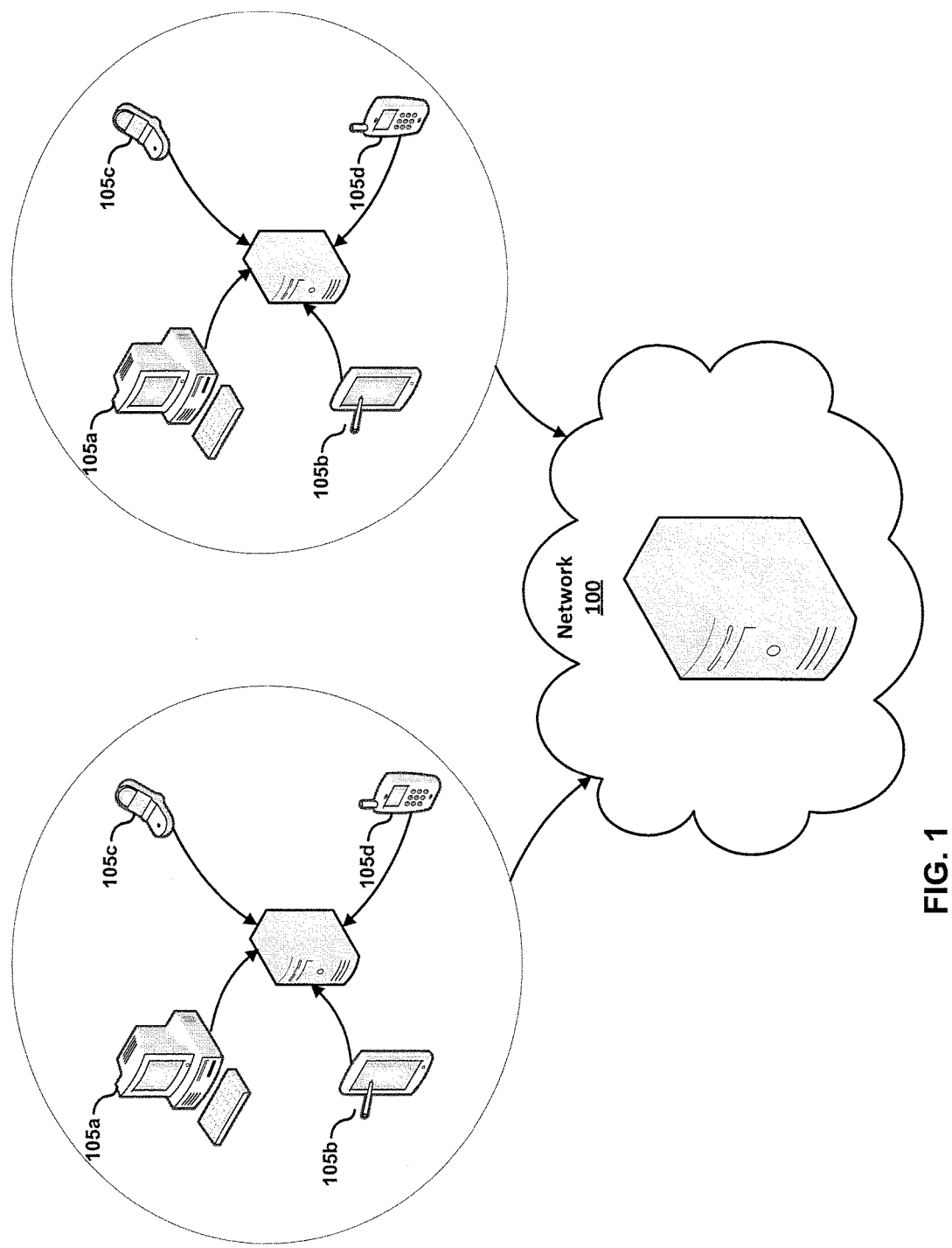
FIG. 1 is a block diagram illustrating an exemplary configuration of a large-scale distributed storage system.
Figure 2A:
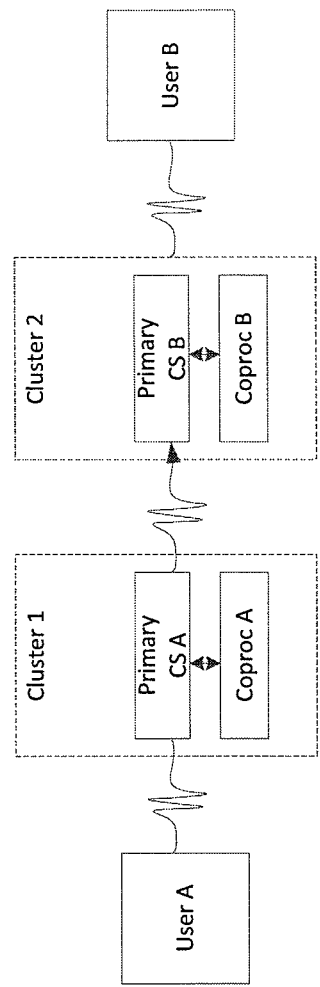
FIG. 2a is a block diagram illustrating a conventional large-scale distributed system configuration in which two users have their current primary serving user data replicas in two different clusters.

In an exemplary embodiment, social-aware clustering may improve network traffic and communication latency by localizing data copying between frequently communicating users. For example, as shown in FIG. 2a, two frequently communicating users, User A and User B may have their current primary serving user data replicas in two different clusters, cluster 1 and cluster 2. This configuration requires that communications between Users A and B travel as inter-cluster or inter-region traffic. As illustrated in FIG. 2a, communications sent from User A to User B must first be sent to User A's current primary serving user data replica which is in cluster 1. Then, the communications must be sent to User B's current primary serving user data replica, which is in cluster 2. Finally, the communications must be sent from User B's current primary serving user data replica to User B.

Figure 2B:
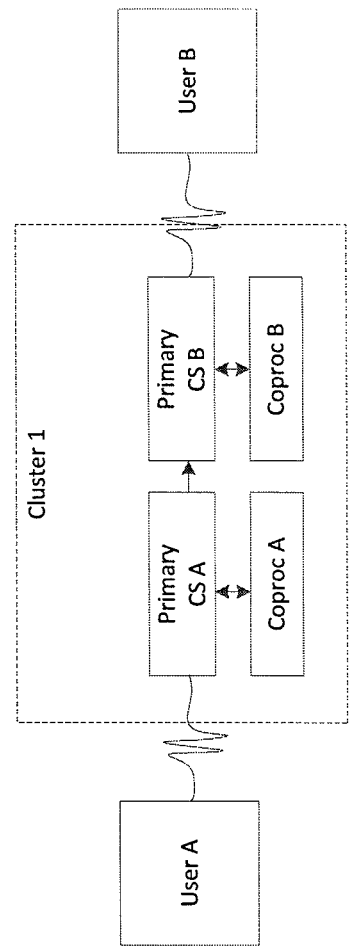
FIG. 2b is a block diagram illustrating an exemplary large-scale distributed system configuration in which two users have their current primary serving user data replicas in the same cluster.

In order to send communications between User A and User B more efficiently, these two frequently communicating users may have their current primary serving user data replicas located in the same cluster so that message delivery between these users does not cause inter-cluster traffic and communication travel can be minimized to provide smaller message delivery latency. FIG. 2b shows a configuration in which User A and User B have their current primary serving user data replicas located in the same cluster, cluster 1, so that inter-cluster traffic does not occur.

Figure 3:
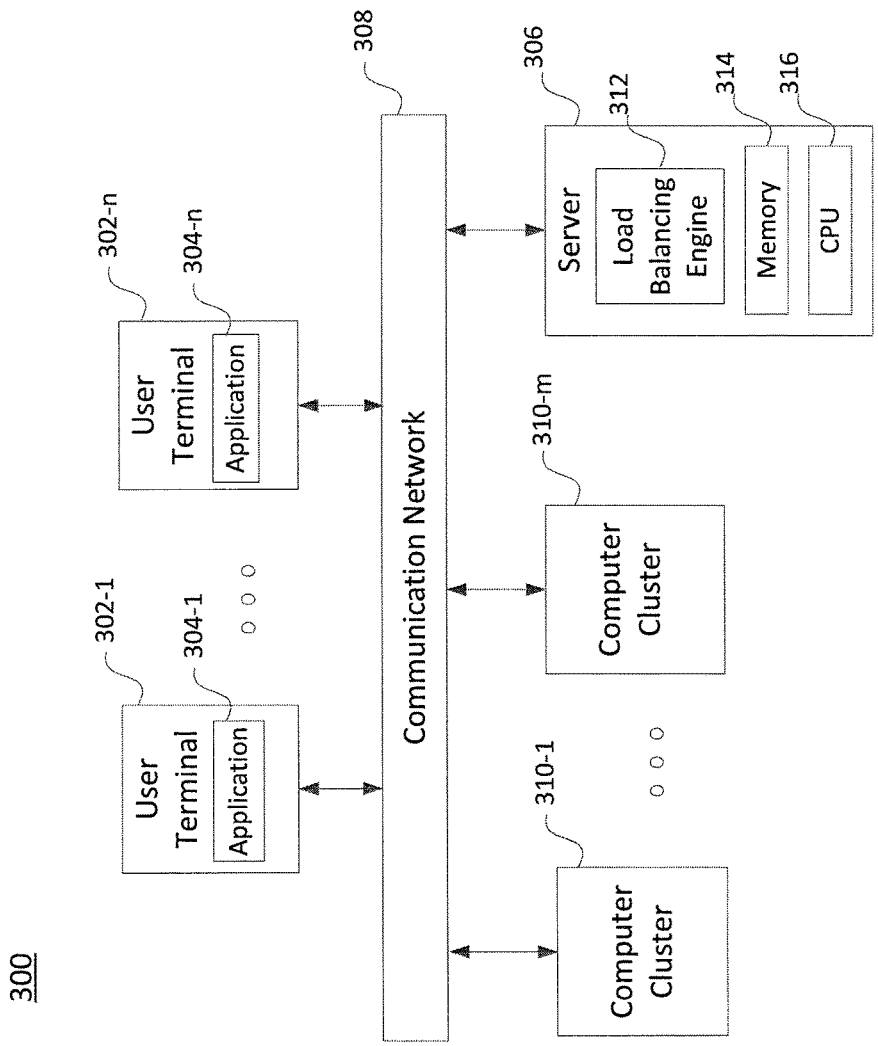
FIG. 3 is a block diagram illustrating an exemplary system for implementing resource allocation in distributed systems.

FIG. 3 illustrates a block diagram of an exemplary distributed system 300 for providing data in a large-scale distributed system. The system 300 includes a plurality of user terminals 302 (e.g. 302-1 . . . 302-$n$), each of which includes one or more applications 304 (e.g. 304-1 . . . 304-$n$), such as an Internet browser. The user terminals 302 are connected to a server 306 and a plurality of computer clusters 310 (e.g., 310-1 . . . 310-$m$) through a network 308 such as the Internet, a local area network (LAN), a wide area network (WAN), a wireless network, or a combination of networks. The server 306 may include one or more load balancing engines 312, one or more memory devices 314, and one or more CPUs 316.

Each of the user terminals 302 may be a computer or similar device through which a user can submit requests to and receive results or services from the server 306.

Examples of the user terminals 302 include, without limitation, desktop computers, notebook computers, tablets, mobile devices such as mobile phones, smartphones, personal digital assistants, set-top boxes, or any combination of devices.

Each of the computer clusters 310 includes one or more computers linked together by a network (not shown) such as the Internet, a local area network (LAN), a wide area network (WAN), a wireless network, or a combination of networks.

In order to determine the appropriate cluster in which to assign a user replica, multiple constraints on user replica placement may be considered. An exemplary system may consider a user's social behavior and social activity patterns, including the frequency with which a user communicates with other users and the type of communication medium used for interactions, in order to place the user's user data replicas in datacenters in a way that increases efficiency and performance of the distributed system.

A user's social behavior and social activity patterns may be analyzed from real-time communications such as teleconferencing, video chat, text chat, and voice communications, and non-real-time communications such as email, blogs, and social network communications. These communications may be received, for example, from observing/monitoring communications among users or from obtaining log files that log user communication information.

Figure 4:
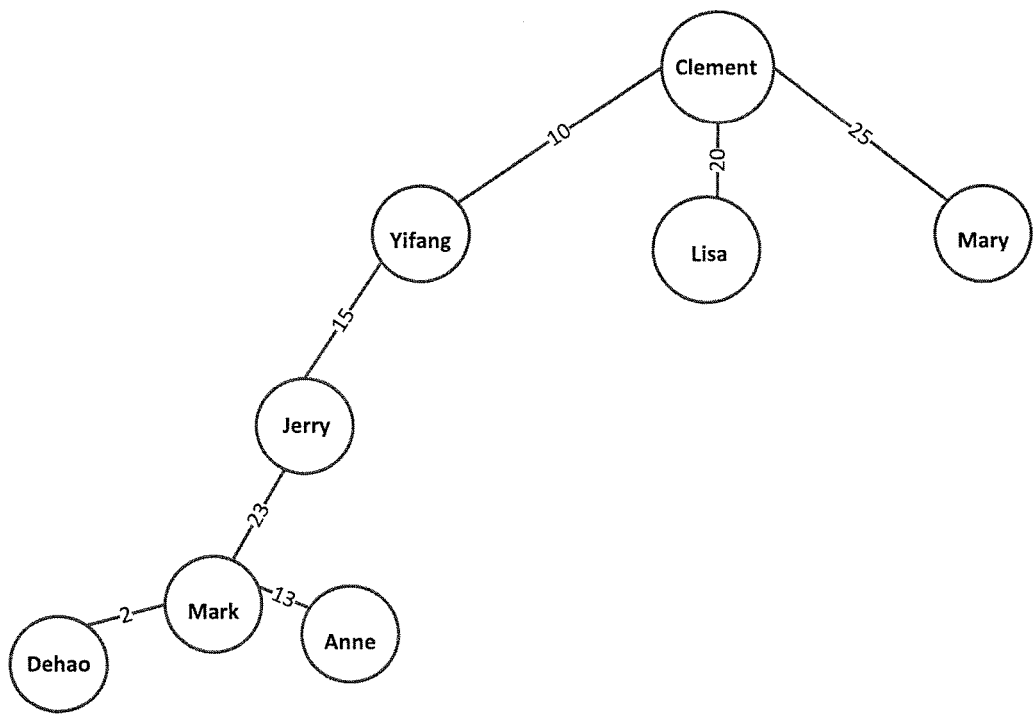
FIG. 4 is an example social graph.

A social graph may be constructed from the communications among users. An example social graph, as illustrated in FIG. 4, may show the connections among users and the connection weights. Connection weights may be based on the frequency with which users communicate and the type of communication used by the users.

In an exemplary embodiment, social-aware clustering may place data replicas of users that have a high weighted connection between each other in close proximity to one another. Close proximity may be defined as a continuous or multi-level metric that is measured in terms of network communication delay/latency or bandwidth usage. The values of proximity may indicate the weighted sum of delay and bandwidth on connections among users in the social graph.

Figure 5:
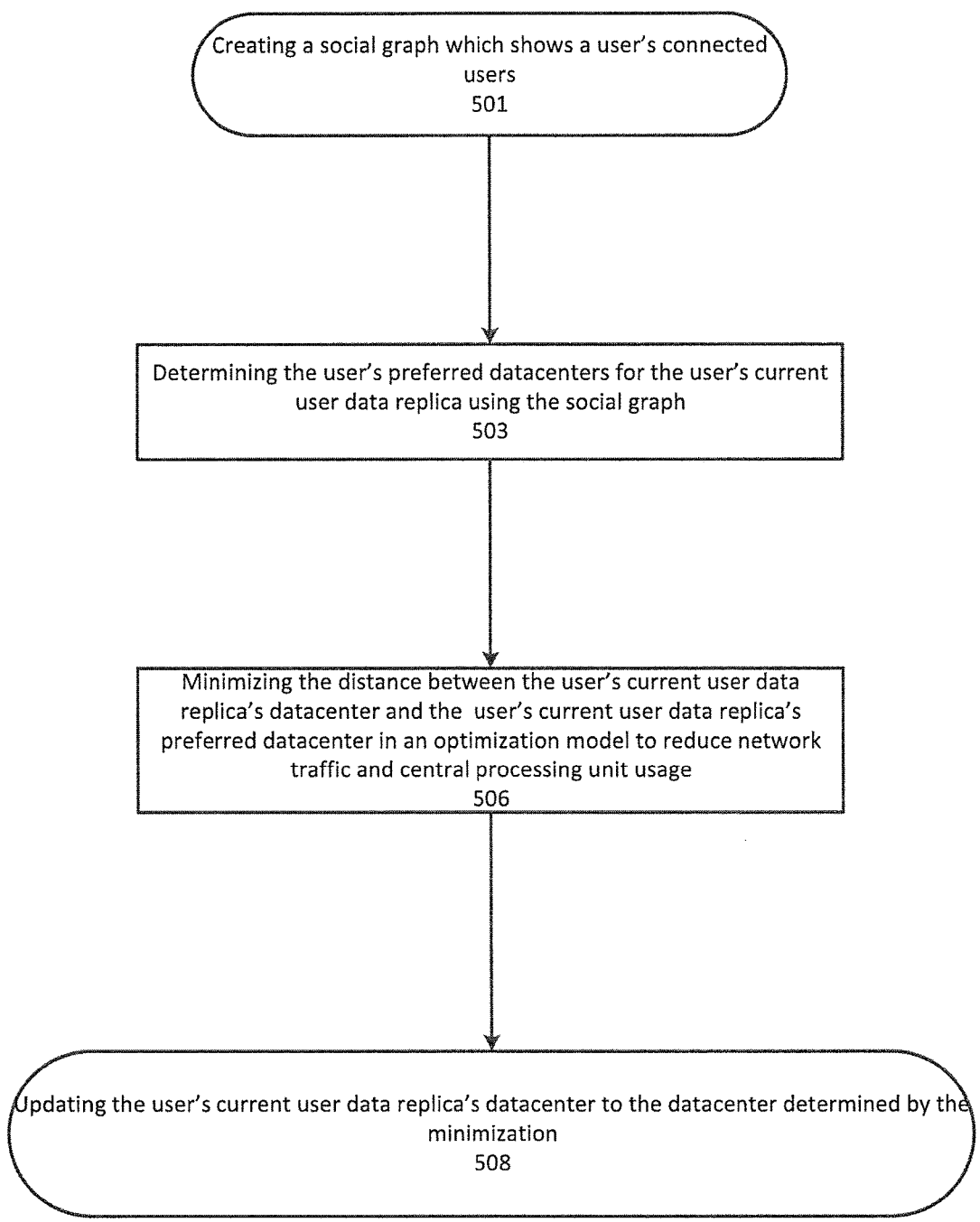
FIG. 5 is a flow diagram of an exemplary method for social-aware clustering of user data replicas in a large-scale distributed computing system.

An exemplary method for improving user data replica placement may begin with creating a social graph which shows a user's connected users as illustrated in FIG. 5 (501). To create the social graph, users' social behavior and activity patterns may be analyzed to identify connected users among users of a large-scale distributed system. As discussed above, the connected users can be determined by using real-time and non-real-time communications. The connection weights among users may also be calculated.

An exemplary method may then use the social graph to determine the user's preferred datacenters for the user's current user data replica (503). Preferred datacenters may be the datacenters currently containing the user's most connected users' user data replicas. To identify these datacenters, the connected users' user data replica placements and locations, i.e. datacenters, may be determined. The connection weights may also be computed among the user and the user's connected datacenters. The weight of the user-datacenter connection may be a function of the user's communication intensity to that datacenter. The connection weight over T types of traffic can be calculated by the following equation:

$$w = \sum_{k=1}^{T} \alpha x_k \times \beta y_k$$

where alpha represents the speed coefficients, beta represents the bandwidth coefficients, and $x_k$ and $y_k$ are the speed requirement and bandwidth demands of the kth traffic type respectively.

When users communicate using different types of communication, such as email, real-time chat, and real-time video/audio, the communication mechanisms may require different amounts of bandwidth and have differing speed requirements. Therefore, bandwidth and speed may be considered when computing the weight of the connection between two users, or a user and the user's connected datacenter.

A social connection decay function may be used in computing the weight on a connection between two users, which is accumulated and smoothed out over n-days. For example, two user's may have been closely communicating friends for a long time and then suddenly stop communicating. The calculated connection between the two users should not be set to 0 immediately since the users may go back to communicating frequently. Instead, a decay function may be used to aggregate user connection weight and intensity over the past n-days with connection weight decaying as time passes by. This function may be represented as an exponential decay function. The equation may be represented as follows:

$$w = \sum_{t=1}^{N} W_t e^{-\lambda t}$$

where $W_t$ is the weight of connection due to the communication on the t th day.

When taking both time-decaying effect and traffic type effect into account, the connection weight may be computed as follows:

$$w = \sum_{t=1}^{N} \left( \sum_{k=1}^{T} \alpha x_k \times \beta y_k \right) e^{-\lambda t}$$

User data and connection weights may be input to an exemplary optimization model to minimize the distance between the user's current datacenter and the user's preferred datacenter in order to improve efficiency in an exemplary large-scale distributed system.

The preferred datacenters for the user's current user data replica may be computed based on the location of the connected datacenters and the weights of the connections and may result in low resource and communication cost. An optimization model may minimize the distance between the user's current user data replica's datacenter and the user's current user data replica's preferred datacenter to reduce network traffic and central processing unit usage (506). An exemplary optimization model should be executed several times while the objective function value improves the results in the user data placement optimization problem. The user's user data replica's datacenter can then be determined using the model. The user's current user data replica's datacenter may be updated to the datacenter determined by the optimization model (508).

In some embodiments, the steps of determining the user's current user data replica's preferred datacenters, minimizing the distance between the user's current user data replica's datacenter and the user's current user data replica's preferred datacenter, and updating the user's current user data replica's datacenter are repeated to incrementally minimize the distance between the evolving current datacenter and the preferred datacenters of the user's user data replica. An exemplary embodiment may also perform all steps described above for each user in the system. Additionally, in some embodiments, users may be grouped by their preferred datacenters or datacenters that minimize the distance between the user's current user data replica's current datacenter and the user's user data replica's preferred datacenter. The purpose of this grouping is to reduce the number of variables in the distance minimization since users in the same group have the same distance minimization target.

In an exemplary system, an optimization model may receive specific user data in order to determine user replica placement and minimize the distance between a user's current datacenter and the user's preferred datacenter. User data may include preferred locations of user data replicas based on factors other than connected users, connected user datacenter locations, and daily traffic intensity. Additionally, as discussed above, user connections may be weighted based on the frequency and type of communications.

Preferred locations may be the clusters that are closest to the most frequent log-in locations of the user. Connected locations may disclose the placement locations of the top k other users with whom the user is communicating most frequently, where k is an arbitrary number of users. Daily traffic intensity may be counted as the number of communications sent or received by the user each day on a d-day average basis, where d is an arbitrary amount of days.

For example, user A may have an average daily traffic intensity of 30 communications in the last two weeks, if every day for the last fourteen (14) days the user has sent or received an average of 30 communications each day. User data may additionally include a daily traffic level, which is a range of daily average traffic intensity. As an example, a traffic level of 3 may correspond to an intensity range of [20, 50). This range means that the average daily communications sent or received by a user is between 20 and 50 communications. The traffic level range calculation may be done by relative standard deviation. Sub-daily activity level may be included in user data. This sub-daily activity level may record a user's activity level at w different time windows each day on d-day average basis, where the w time windows are mutually-exclusive and together compose a 24 hour day. For example, user A may send or receive an average of 10-20 communications between the hours of 8 am PST and 10 pm PST. Additionally, user A may send or receive an average of 1-10 communications between the hours of 10 pm PST and 8 am PST. 10-20 communications may correspond to a traffic level of 2 and 1-10 communications may correspond to a traffic level of 1. User A's sub-daily activity levels may be represented as: {[8 PST, 20 PST): level 2, [20 PST, 8 PST): level 1}.

Figure 6:
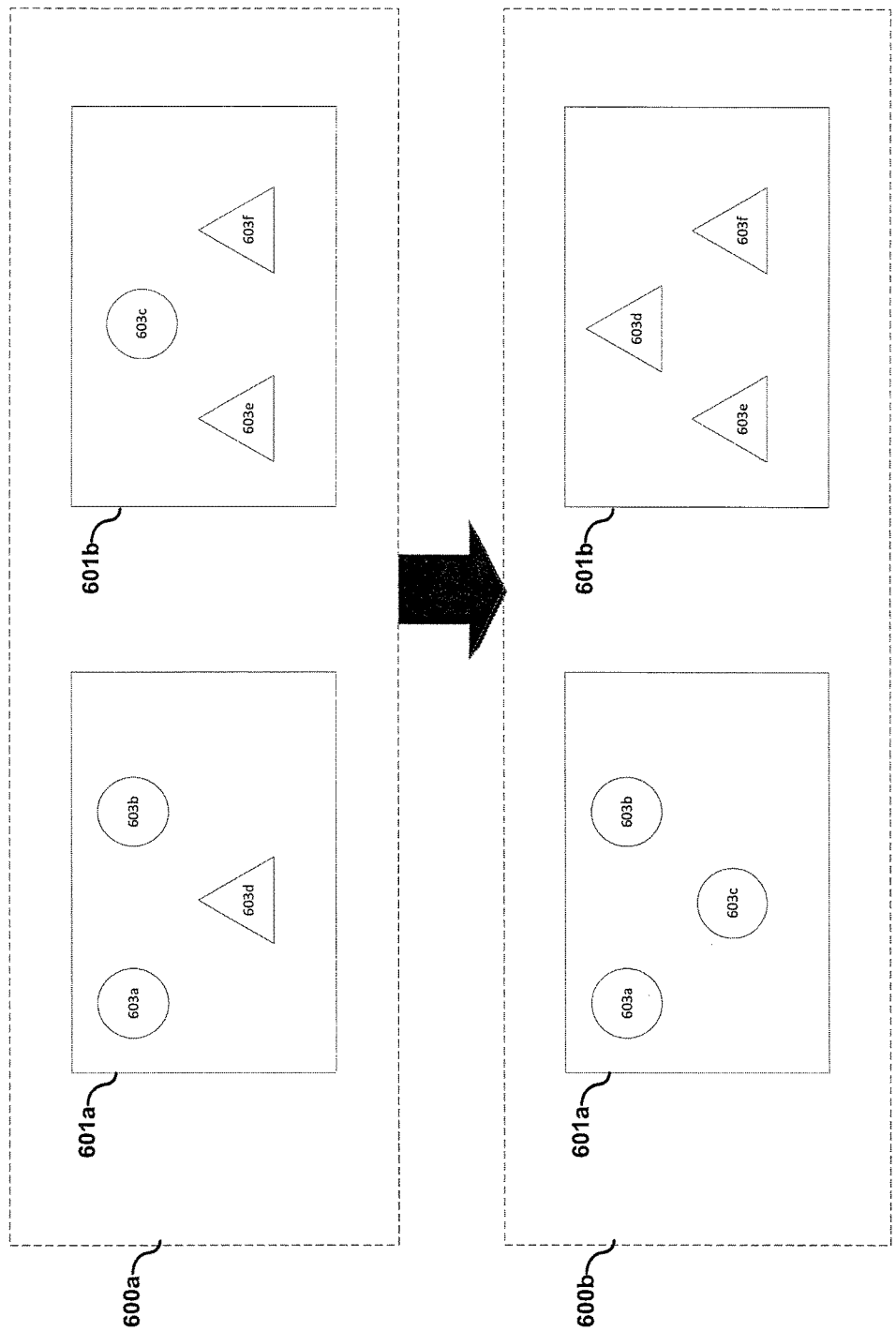
FIG. 6 is an example of social-aware clustering.

An example of social-aware clustering is illustrated in FIG. 6. FIG. 6 shows two sets of diagrams, one diagram (600*a*) of two datacenters (601*a* and 601*b*) prior to performing social-aware clustering and one diagram (600*b*) of the two datacenters (601*a* and 601*b*) after performing social-aware clustering. Prior to performing social-aware clustering, datacenter (601*a*) contains three data replicas, 603*a*, 603*b*, and 603*d*. Datacenter (601*b*) contains three data replicas (603*c*, 603*e*, and 603*f*). For example purposes only, one group of frequently communicating users is denoted by circles and one group of frequently communicating users is denoted by triangles. For this example, it is assumed that each datacenter has the capacity of serving three users.

During the social-aware clustering process, the users' current datacenters are identified, i.e. where the users' current user replicas are located. As discussed above, user replicas 603a, 603b, and 603d are located in datacenter 601a. User replicas 603c, 603e, and 603f are located in datacenter 601b. For each user, an exemplary method determines the user's frequently communicating users. In this example, all of the circle users, represented by user replicas 603a, 603b, and 603c, may frequently communicate with one another and all of the triangle users, represented by user replicas 603d, 603e, and 603f may frequently communicate with one another. For each user, an exemplary method may compute the user's communication intensity with each datacenter. Then, the preferred datacenter for the user is determined by identifying the datacenter with the highest communication intensity for the user. In the example depicted in FIG. 6, all of the circle users have the same preferred datacenter, 601a, and all of the triangle users have the same preferred datacenter, 601b. Based on the preferred datacenters, the exemplary method puts the circle users into one group and the triangle users into another. Then, the optimization problem is updated with the newly computed preferred datacenters of the users and the user groups. The updated optimization problem may be solved to move every user towards its preferred datacenter. Every user's current datacenter may be updated according to the result of the optimization as shown in 600b.

Figure 7:
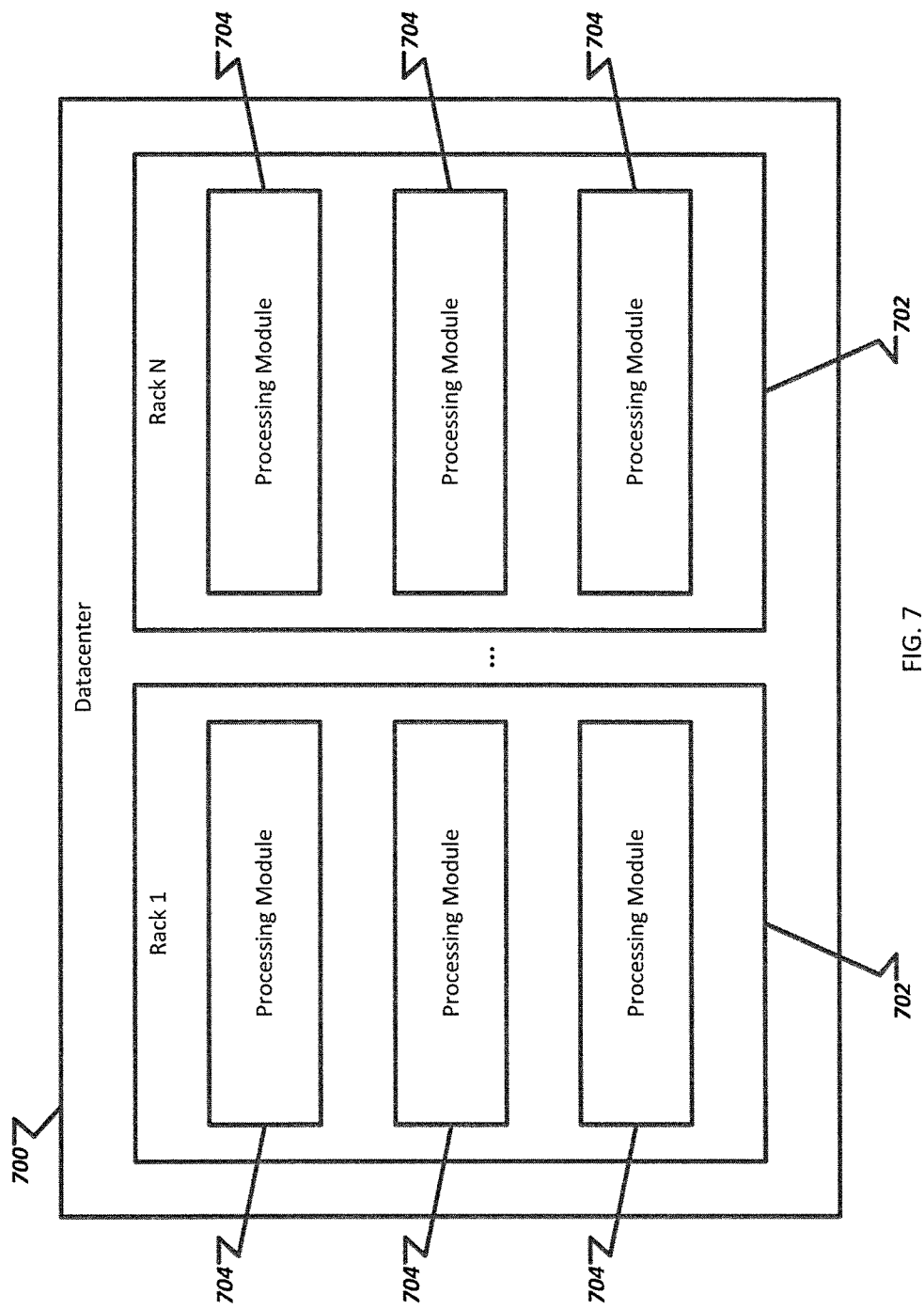
FIG. 7 is an example datacenter.

FIG. 7 is a block diagram illustrating an example of a datacenter (700) where user data replicas are stored and large-scale data processing may be performed. The data center (700) is used to store data, perform computational tasks, and transmit data to other systems outside of the datacenter using, for example, a network connected to the datacenter. In particular, the datacenter (700) may perform large-scale data processing on massive amounts of data.

The datacenter (700) includes multiple racks (702). While only two racks are shown, the datacenter (700) may have many more racks. Each rack (702) can include a frame or cabinet into which components, such as processing modules (704), are mounted. In general, each processing module (704) can include a circuit board, such as a motherboard, on which a variety of computer-related components are mounted to perform data processing. The processing modules (704) within each rack (702) are interconnected to one another through, for example, a rack switch, and the racks (702) within each datacenter (700) are also interconnected through, for example, a datacenter switch.

In some implementations, the processing modules (704) may each take on a role as a master or worker. The master modules control scheduling and data distribution tasks among themselves and the workers. A rack can include storage, like one or more network attached disks, that is shared by the one or more processing modules (704) and/or each processing module (704) may include its own storage. Additionally, or alternatively, there may be remote storage connected to the racks through a network.

The datacenter (700) may include dedicated optical links or other dedicated communication channels, as well as supporting hardware, such as modems, bridges, routers, switches, wireless antennas and towers. The datacenter (700) may include one or more wide area networks (WANs) as well as multiple local area networks (LANs).

Figure 8:
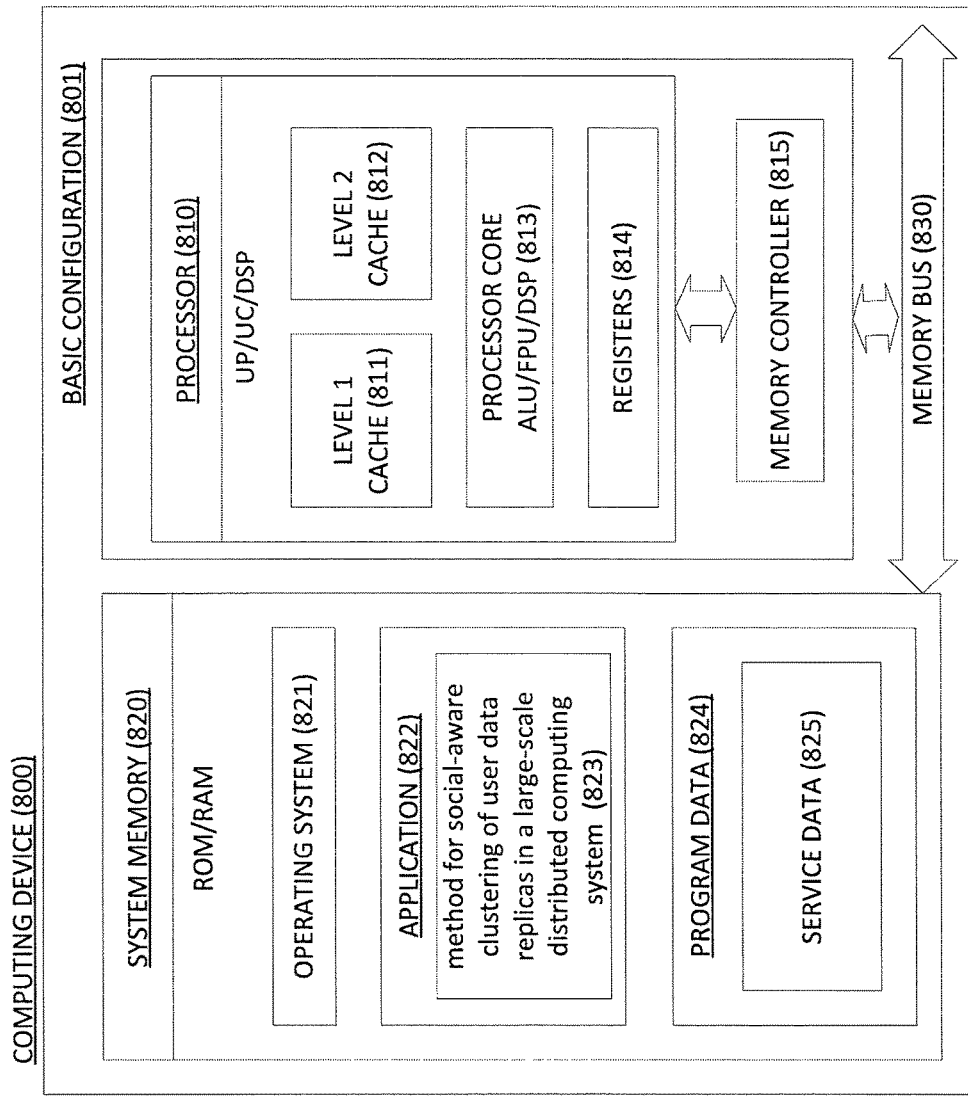
FIG. 8 is a block diagram illustrating an exemplary computing device.

FIG. 8 is a high-level block diagram of an example computer (800) that is arranged for using social-aware clustering of user data replicas to improve efficiency and performance in a distributed computing system. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (μP), a microcontroller (μC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more applications (822), and program data (824). The application (822) may include a method for social-aware clustering of user data replicas in a large-scale distributed computing system. Program Data (824) includes storing instructions that, when executed by the one or more processing devices, implement a method for social-aware clustering and multi-user aggregation. (823). In some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for social-aware clustering of user data replicas in a large-scale distributed computing system, the method comprising:
    creating a social graph based on communications between users of the large-scale distributed system, the social graph including nodes representing particular users of the large-scale distributed system, and weighted links between the nodes which represent communications between two users, each weight associated with the respective weighted link determined as a function of communication frequency and types of communication between the two linked users, and the types of communication consuming different amounts of bandwidth and having different latency requirements;
    identifying, for each of the users, connected datacenters which corresponded to a placement datacenter of the top k other users with whom the respective user communicates most frequently based on the social graph, where k is a predefined number and the placement datacenter is the datacenter where a current user data replica associated with the respective user is stored;
    identifying, for each of the users, a daily traffic intensity which corresponds to the number of communications sent or received by the respective user each day on a d-day average basis, where d is a predefined number of days;
    determining, for each of the users and based on the connected datacenters identified for the respective user, a preferred datacenter for storing the current user data replica associated with the respective user;
    determining, using an optimization model, user replica placement for each of the users that minimizes a distance between the current datacenter storing the current user data replica associated with each of the users and the preferred datacenter for storing the current user data replica associated with each of the users, the optimization model receiving user specific data including the connected datacenters; and
    updating the datacenter for the current user data replica associated with each of the users to the datacenter determined by the optimization model.

2. The computer-implemented method of claim 1, further comprising grouping the users by the preferred datacenter for the current user data replica associated with the respective user prior to using the optimization model to minimize the distance between the datacenter for the current user data replica associated with the respective user and the preferred datacenter for the current user data replica associated with the respective user.

3. The method of claim 1, further comprising using the daily traffic level to determine the preferred datacenters.

4. The method of claim 1, wherein creating the social graph includes a social connection decay function.

5. The method of claim 1, wherein creating the social graph includes a communication traffic combination function to compute the weight on the respective weighted links between the user nodes.

6. The method of claim 1, wherein creating the social graph includes computing the weights between the users using a function that takes into account both a time-decaying effect and a traffic type effect.

7. A system for social-aware clustering of user data replicas in a large-scale distributed computing system, the system comprising:
    one or more processing devices and
    one or more storage devices storing instructions that, when executed by the one or more processing devices, cause the one or more processing devices to:
    create a social graph based on communications between users of the large-scale distributed system, the social graph including nodes representing particular users of the large-scale distributed system, and weighted links between the nodes which represent communications between two users, each weight associated with the respective weighted link determined as a function of communication frequency and types of communication between the two linked users, and the types of communication consuming different amounts of bandwidth and having different latency requirements;
    identify, for each of the users, connected datacenters which corresponded to a placement datacenter of the top k other users with whom the respective user communicates most frequently based on the social graph, where k is a predefined number and the placement datacenter is the datacenter where a current user data replica associated with the respective user is stored;
    identify, for each of the users, a daily traffic intensity which corresponds to the number of communications sent or received by the respective user each day on a d-day average basis, where d is a predefined number of days;

determine, for each of the users and based on the connected datacenters identified for the respective user, a preferred datacenter for storing the current user data replica associated with the respective user;

determine, using an optimization model, user replica placement for each of the users that minimizes a distance between the current datacenter storing the current user data replica associated with each of the users and the preferred datacenter for storing the current user data replica associated with each of the users, the optimization model receiving user specific data including the connected datacenters; and update the datacenter for the current user data replica associated with each of the users to the datacenter determined by the optimization model.

8. The system of claim 7, further comprising grouping the users by the preferred datacenter for the current user data replica associated with the respective user prior to using the optimization model to minimize the distance between the datacenter for the current user data replica associated with the respective user and the preferred datacenter for the current user data replica associated with the respective user.

9. The system of claim 7, further comprising using the daily traffic level to determine the preferred datacenters.

10. The system of claim 7, wherein creating the social graph includes a social connection decay function.

11. The system of claim 7, wherein creating the social graph includes a communication traffic combination function to compute the weight on the respective weighted links between the user nodes.

12. The system of claim 7, wherein creating the social graph includes computing the weights between the users using a function that takes into account both a time-decaying effect and a traffic type effect.

* * * * *